United States Patent
Butzmann

(10) Patent No.: US 7,242,181 B2
(45) Date of Patent: Jul. 10, 2007

(54) ARRANGEMENT FOR DETERMINING POSITION OF A SENSOR IN A MAGNETIC FIELD

(75) Inventor: Stefan Butzmann, Hagen (DE)

(73) Assignee: NXP B.V., Eindhoven (NL)

( * ) Notice: Subject to any disclaimer, the term of this patent is extended or adjusted under 35 U.S.C. 154(b) by 62 days.

(21) Appl. No.: 10/541,415

(22) PCT Filed: Dec. 15, 2003

(86) PCT No.: PCT/IB03/06269

§ 371 (c)(1), (2), (4) Date: Jul. 1, 2005

(87) PCT Pub. No.: WO2004/063672

PCT Pub. Date: Jul. 29, 2004

(65) Prior Publication Data

US 2006/0097716 A1 May 11, 2006

(30) Foreign Application Priority Data

Jan. 8, 2003 (EP) .................................. 03100018

(51) Int. Cl.
*G01B 7/14* (2006.01)
(52) U.S. Cl. ............................. 324/207.24; 324/207.21
(58) Field of Classification Search ............................... 324/207.12–207.25
See application file for complete search history.

(56) References Cited

U.S. PATENT DOCUMENTS

| 6,724,185 B2 * | 4/2004 | Ooki et al. ............... 324/207.2 |
| 6,798,195 B2 * | 9/2004 | Luetzow ................ 324/207.24 |
| 2004/0017187 A1 * | 1/2004 | Van Ostrand et al. .. 324/207.21 |

* cited by examiner

*Primary Examiner*—Jay M. Patidar
(74) *Attorney, Agent, or Firm*—Peter Zawilski

(57) ABSTRACT

A description is given of an arrangement for determining the position of a magnetic-field-sensitive sensor unit in the magnetic field of a magnet arrangement having an at least substantially bar-shaped contour along an at least substantially rectilinear motion coordinate that extends parallel to a longitudinal axis of the at least substantially bar-shaped contour, in which the magnetic-field-sensitive sensor unit is intended to measure a component of the magnetic field which extends in a plane that is at least substantially parallel to the longitudinal axis of the at least substantially bar-shaped contour in a manner at least substantially perpendicular to this longitudinal axis, and the magnet arrangement has a magnetic north pole in the region of a first end of the at least substantially bar-shaped contour, a magnetic south pole in the region of a second end of the at least substantially bar-shaped contour, and a narrowing of the at least substantially bar-shaped contour in the central region extending between the north pole and the south pole. Better use can thereby be made of the dimension of the magnet arrangement than for a range that can be used for position measurement.

8 Claims, 3 Drawing Sheets

ARRANGEMENT FOR DETERMINING POSITION OF A SENSOR IN A MAGNETIC FIELD

The invention relates to an arrangement for determining the position of a magnetic-field-sensitive sensor unit in the magnetic field of a magnet arrangement having an at least substantially bar-shaped contour.

Magnetic-field-sensitive sensors, in particular those designed as magnetoresistive sensors, are used in many systems for measuring magnetic fields. The most frequent applications include the use in motor vehicle technology as engine speed sensors in antilocking systems or in systems for the electronic control of combustion engines, also referred to as engine management systems, and as angle sensors for picking up rotary movements. However, even in new applications within the motor vehicle technology sector, it is desirable to use magnetic-field-sensitive sensors, in particular those referred to as AMR sensors ("AMR"="anisotropic magnetoresistive"), to determine movements of constructional elements of motor vehicle technology even along motion coordinates that are at least almost rectilinear.

In the data sheet "General—Magnetic field sensors" dated 9 Jan. 1997, pages 49ff., which appeared in the series of data sheets "Discrete Semiconductors" by the company Philips Semiconductors, a description is given of linear position measurement using magnetoresistive sensors. The arrangement described therein is reproduced in FIG. 1 and shows the use of a magnetoresistive sensor having a so-called standard bridge, that is to say a Wheatstone bridge circuit of four magnetoresistive elements having a magnet arrangement that is in this case designed as a bar magnet. As an example, this figure shows the use of a magnetoresistive sensor of the type KMZ 10 B, as sold by the company Philips Semiconductors. This sensor is described in more detail on page 4 of the abovementioned data sheet. The magnetic field lines of the magnetic field generated by the bar magnet in this case run, as shown in FIG. 1, from Ache magnetic north pole which points upward in the figure to the magnetic south pole which points downward in the figure. The magnetoresistive sensor is arranged in a plane generated by Cartesian coordinates x and y, in which plane the schematically illustrated field line also runs and likewise the bar magnet is arranged with its longitudinal center axis. If the position of the bar magnet with respect to the magnetoresistive sensor changes, both the field strength in the y direction extending perpendicular to the longitudinal center axis of the bar magnet and the field strength in the x direction extending parallel to the longitudinal center axis of the bar magnet change at the location of the magnetoresistive sensor. Both field components have an influence on a bridge output signal that is output by the Wheatstone bridge circuit of the sensor. The bridge output signal is proportional to the field strength in the y direction, but the sensitivity of the sensor decreases as the field strength in the x direction increases.

In the arrangement shown in FIG. 1, the field strength in the x direction has a constant sign for all positions of the bar magnet with respect to the magnetoresistive sensor that are to be measured. This is important so as to avoid what is known as flipping, that is to say an inversion of the sensor transfer characteristic. If the sensor is located at the upper end of the magnet, that is to say is pushed along the motion coordinate toward its north pole, then a negative value is measured for the magnetic field strength of the magnetic field in the y direction that is generated by the bar magnet. If, on the other hand, the sensor is located at the lower end of the magnet, that is to say is pushed along the motion coordinate toward its south pole, then a positive value is measured for the magnetic field strength of the magnetic field in the y direction that is generated by the bar magnet.

On account of the changing field strength in the x direction, however, the bridge output signal output by the sensor does not change proportionally to the value of the field strength measured in the y direction. FIG. 2 shows, by way of example, a variation over time of this bridge output signal at a supply voltage of 5 V for a change in position of the sensor with respect to the bar magnet along the motion coordinate between the north pole and the south pole of the bar magnet of at most ±5 mm for a bar magnet having a length of 10 mm. The bridge output signal is given as a voltage in millivolts having the designation "$U_{out}$/mV" and the change in position of the sensor with respect to the bar magnet along the motion coordinate is given as a value of the Cartesian coordinate x, calculated from the center between the north pole and the south pole of the bar magnet, having the designation "x/mm".

The diagram of FIG. 2 shows, within the entire range of this change in position of the sensor with respect to the bar magnet along the motion coordinate of in this case ±5 mm with average values of the change in position—in this case from values of x of about −3 mm to +3 mm—a section in which the bridge output signal runs linearly proportionally to the change in position of the sensor with respect to the bar magnet, while toward the ends of the range of this change in position shown overall, in this case of at most ±5 mm, the bridge output signal assumes a nonlinear profile on account of the greatly decreasing values for the magnetic field strength in the x direction. Where there is this nonlinear profile, the bridge output signal can no longer be used for the desired position measurement. The range along the motion coordinate between the north pole and the south pole of the bar magnet that can be used in this arrangement for position measurement is shown in FIG. 1 by the designation "displacement range". It can be seen that this range along the motion coordinate that can be used for position measurement makes use of the dimension of the bar magnet between its north pole and its south pole only to an insufficient extent. Using the arrangement shown in FIG. 1, it is therefore necessary to select the length of the magnet, that is to say the dimension of the bar magnet along the motion coordinate, to be considerably greater than the range that can be used for position measurement. In the example shown in FIGS. 1 and 2, a bar magnet is required which is approximately 1.5 times longer that the range that can be used for position measurement. This is disadvantageous on account of the increased space requirement of the arrangement and also the material requirement for the bar magnet.

It is an object of the invention to provide an arrangement for determining the position of a magnetic-field-sensitive sensor unit in the magnetic field of a magnet arrangement having an at least substantially bar-shaped contour, by means of which better use can be made of the dimension of the magnet arrangement than for a range that can be used for position measurement.

According to the invention, this object is achieved by an arrangement for determining the position of a magnetic-field-sensitive sensor unit in the magnetic field of a magnet arrangement having an at least substantially bar-shaped contour along an at least substantially rectilinear motion coordinate that extends parallel to a longitudinal axis of the at least substantially bar-shaped contour, in which the magnetic-field-sensitive sensor unit is intended to measure a component of the magnetic field which extends in a plane that is at least substantially parallel to the longitudinal axis of the at least substantially bar-shaped contour in a manner at least substantially perpendicular to this longitudinal axis, and the magnet arrangement has a magnetic north pole in the region of a first end of the at least substantially bar-shaped contour, a magnetic south pole in the region of a second end of the at least substantially bar-shaped contour, and a narrowing of the at least substantially bar-shaped contour in the central region extending between the north pole and the south pole.

The invention is based on the knowledge that a shortening of the magnet arrangement can be achieved if it is possible to generate significant field strengths in the direction of the longitudinal axis of the magnet arrangement, that is to say in the direction of the motion coordinate or in the x direction, even at the ends of the magnet arrangement in the region of the magnetic north and south poles.

The invention achieves this result, using the described knowledge, in an advantageous manner by the measures according to the invention. On account of the narrowing of the magnet arrangement in the center, the exit angle of the field lines at the ends of the magnet arrangement in the region of the magnetic north and south poles is changed, so that greater magnetic field strengths are generated in the x direction. As a result, a shortening of the magnet arrangement can be achieved without changing the extent of the range that can be used for position measurement.

The precise shaping of the at least substantially bar-shaped contour of the magnet arrangement according to the invention can easily be determined and optimized by means of a simple experiment for each application. According to an advantageous development of the invention, however, the narrowing of the at least substantially bar-shaped contour corresponds at least in sections to a shape that at least substantially follows the profile of an ellipse. According to another advantageous development of the invention, the narrowing of the at least substantially bar-shaped contour corresponds at least in sections to a shape that at least substantially follows the profile of a cycloid. By means of such contours that are clearly defined in mathematical and constructional terms, a shaping of the magnet arrangement according to the invention is obtained that can easily be reproduced.

Advantageously, the magnetic-field-sensitive sensor unit is designed with a Wheatstone bridge of magnetoresistive elements, the longitudinal direction of which extends at least substantially along the motion coordinate. Such a sensor unit is given in a simple and cost-effective manner by the abovementioned magnetoresistive sensor of the type KMZ 10 B, as sold by the company Philips Semiconductors.

In order to use the invention in an arrangement for determining the relative position of a first body and a second body with respect to one another, e.g. of a first and a second machine element, advantageously the magnet arrangement is connected to this first body and the sensor unit is connected to the second body, in order to determine the position of the first body with respect to the second body along the motion coordinate. In particular, the sensor unit is connected to the body which is arranged fixedly with respect also to an evaluation and control arrangement that is to be connected to the sensor unit, and the magnet arrangement is connected to the body which is designed to move with respect to said first body. This simplifies the transmission of signals output by the sensor unit and also the supplying of signals and power to this sensor unit. However, the sensor unit and the magnet arrangement may also be connected to said bodies the other way round, if appropriate provisions for the supply of signals and power have been made for these installation conditions.

In a preferred application of the arrangement according to the invention, the first and second bodies are formed by parts of a motor vehicle. In particular, the first and second bodies are formed by parts of the internal combustion engine of a motor vehicle. In a particularly preferred application, the second body comprises part of a valve mechanism for the internal combustion engine of a motor vehicle, and the first body is designed with a part of the valve mechanism that can move with respect thereto.

The invention can be used as an advantageous configuration for an electromagnetic valve mechanism for the internal combustion engine of a motor vehicle, in which the position of an armature, connected to a valve disk, in an electromagnetic actuator that operates the valve is to be measured for the purpose of regulating the speed of placing the valve disk onto the valve seat. It should be taken into account that typical valve lifts in internal combustion engines of motor vehicles move between 8 and 12 mm, and in exceptional cases even greater valve lifts may occur. For this reason, an arrangement is required that can detect a rectilinear movement over such a range. The arrangement according to the invention is preferably suited to this purpose not only on account of its compact design and its robustness but also because it deals with the generation of a sensor output signal with the necessary processing speed. For the engine speeds occurring in motor vehicle internal combustion engines of today, and thus the short actuation times required for the valve mechanism, resulting in changeover times of the electromagnetic actuators of between 3 and 10 ms, the arrangement according to the invention with an "AMR" sensor has sufficiently rapid signal processing. Moreover, the arrangement according to the invention is able to supply precise information about the measured position, the so-called "absolute position" of the actuator, in any operating situation and thus even immediately upon startup.

The invention will be further described with reference to examples of embodiments shown in the drawings to which, however, the invention is not restricted.

Figure 3:
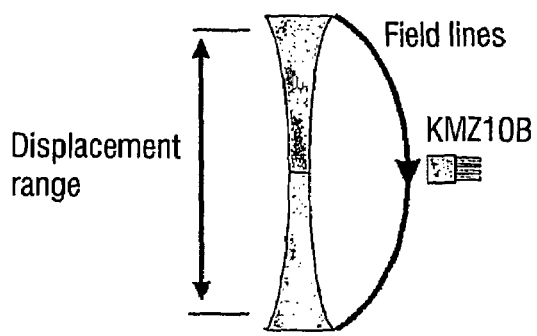
FIG. 3 shows an example of embodiment of an arrangement according to the invention for linear position measurement using a magnetoresistive sensor of the type KMZ 10 B having a so-called standard bridge.

In the example of embodiment of the invention shown in FIG. 3, an arrangement for linear position measurement using a magnetoresistive sensor of the type KMZ 10 B is again shown, as is known from the abovementioned data sheet "General—Magnetic field sensors" of 9 Jan. 1997, page 4. The arrangement of FIG. 3 shows the use of this magnetoresistive sensor having a magnet arrangement that is in this case again designed as a bar magnet. The magnetic field lines of the magnetic field generated by the bar magnet in this case run, as shown in FIG. 3, from the magnetic north pole which points upward in the figure to the magnetic south pole which points downward in the figure. The magnetoresistive sensor is arranged in a plane generated by Cartesian coordinates x and y, in which plane the schematically illustrated field line also runs and likewise the bar magnet is arranged with its longitudinal center axis. If the position of the bar magnet with respect to the magnetoresistive sensor changes, both the field strength in the y direction extending perpendicular to the longitudinal center axis of the bar magnet and the field strength in the x direction extending parallel to the longitudinal center axis of the bar magnet change at the location of the magnetoresistive sensor. Both field components have an influence on the bridge output signal that is output by the Wheatstone bridge circuit of the sensor. The bridge output signal is again proportional to the field strength in the y direction, but the sensitivity of the sensor decreases as the field strength in the x direction increases.

Figure 1:
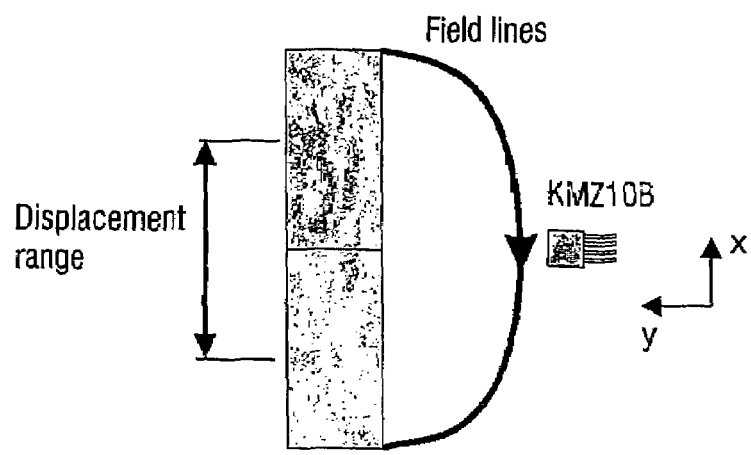
FIG. 1 shows an arrangement according to the prior art for linear position measurement using a magnetoresistive sensor of the type KMZ 10 B having a so-called standard bridge.
Figure 2:
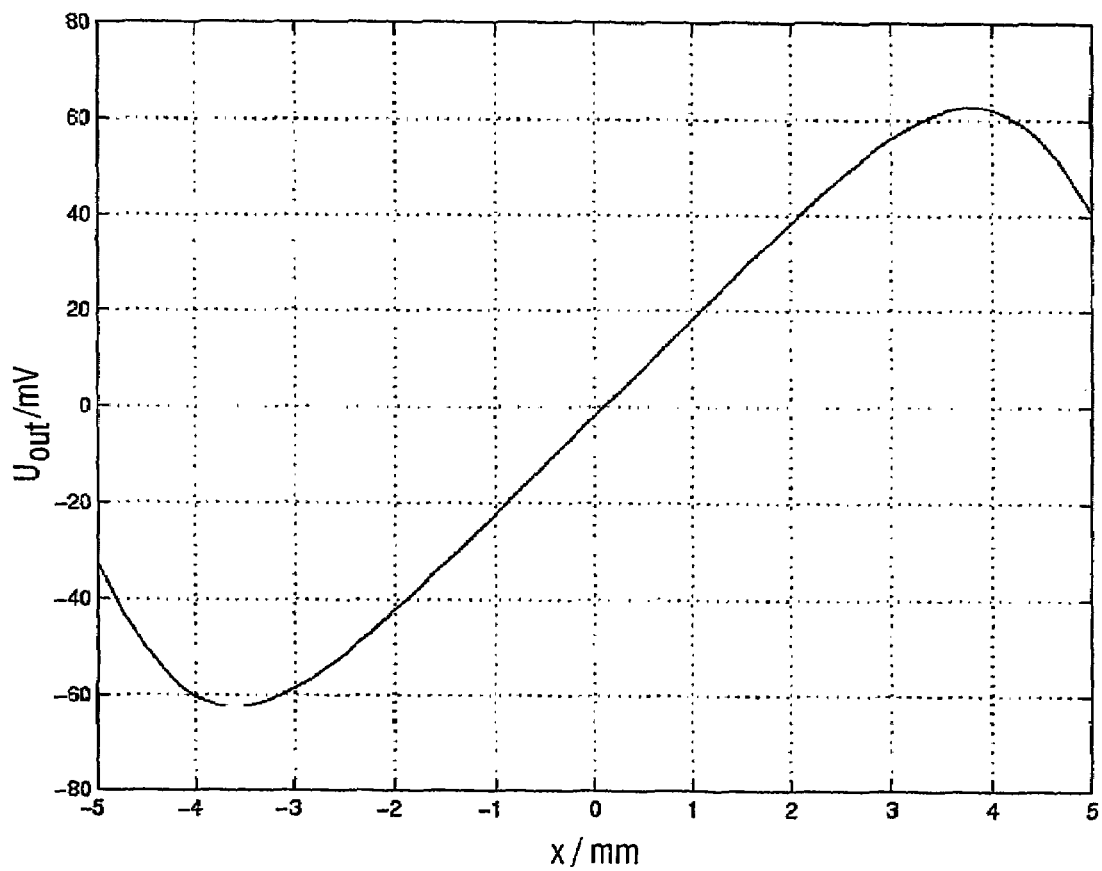
FIG. 2 shows, by way of example, the variation over time of the bridge output signal of the magnetoresistive sensor of the type KMZ 10 B in the arrangement of FIG. 1.

In the arrangement shown in FIG. 1, the field strength in the x direction has a constant sign for all positions of the bar magnet with respect to the magnetoresistive sensor that are to be measured. This is important so as to avoid what is known as flipping, that is to say an inversion of the sensor transfer characteristic. If the sensor is located at the upper end of the magnet, that is to say is pushed along the motion coordinate toward its north pole, then a negative value is measured for the magnetic field strength of the magnetic field in the y direction that is generated by the bar magnet. If, on the other hand, the sensor is located at the lower end of the magnet, that is to say is pushed along the motion coordinate toward its south pole, then a positive value is measured for the magnetic field strength of the magnetic field in the y direction that is generated by the bar magnet.

The bar magnet used in the arrangement shown in FIG. 3 has a narrowing in the central region between its magnetic north pole at the first end of the at least substantially bar-shaped contour and its magnetic south pole at the second end of its at least substantially bar-shaped contour. This makes it possible for significant field strengths to be generated in the direction of the longitudinal axis of the bar magnet, that is to say in the direction of the motion coordinate or in the x direction, even at the ends of the magnet arrangement in the region of the magnetic north and south poles. On account of the narrowing of the bar magnet in the center, the exit angle of the field lines at the ends of the bar magnet in the region of the magnetic north and south poles is changed, so that greater magnetic field strengths are generated in the x direction. As a result, a shortening of the bar magnet can be achieved without changing the extent of the range that can be used for position measurement.

Figure 4:
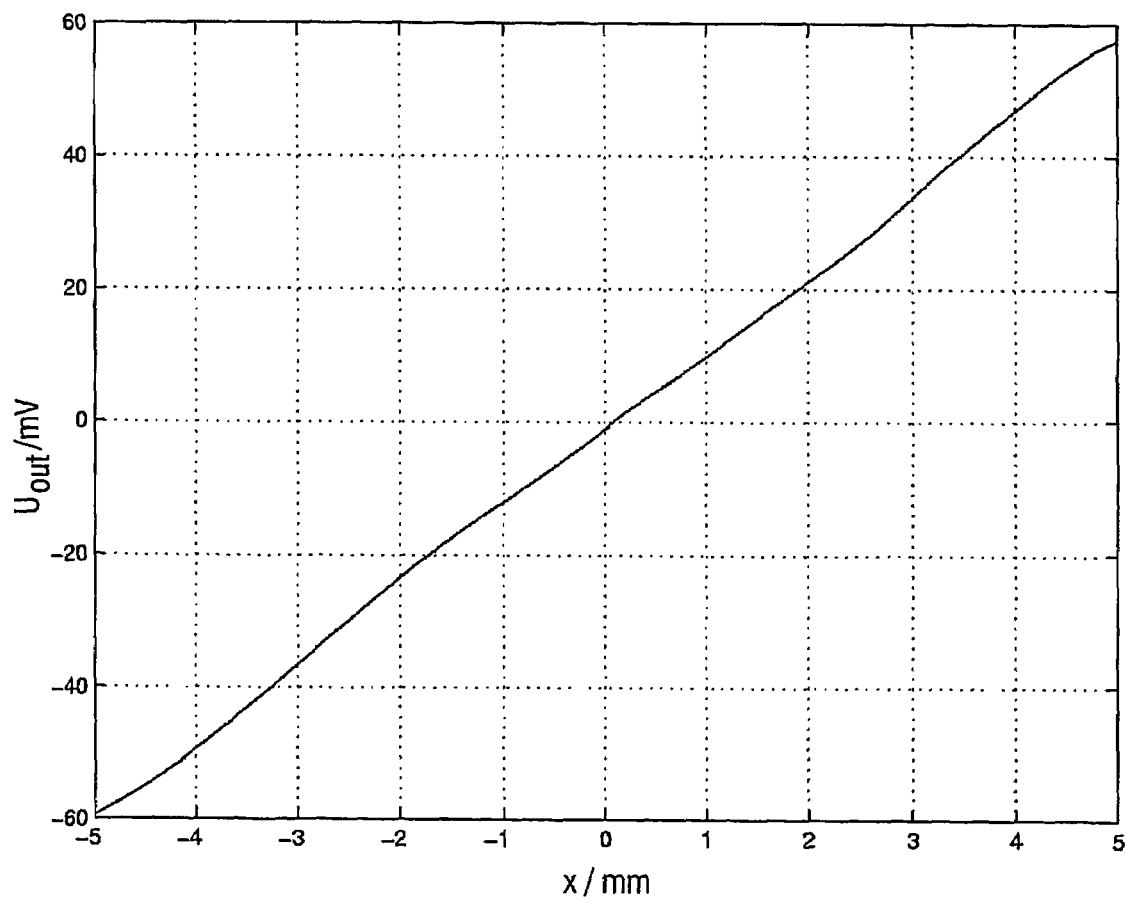
FIG. 4 shows, by way of example, the variation over time of the bridge output signal of the magnetoresistive sensor of the type KMZ 10 B in the arrangement of FIG. 3.

FIG. 4 shows, by way of example, a variation over time of this bridge output signal at a supply voltage of 5 V for a change in position of the sensor with respect to the bar magnet along the motion coordinate between the north pole and the south pole of the bar magnet of at most ±5 mm for a bar magnet having a length of 11 mm. The bridge output signal is again given as a voltage in millivolts having the designation "$U_{out}$/mV" and the change in position of the sensor with respect to the bar magnet along the motion coordinate is given as a value of the Cartesian coordinate x, calculated from the center between the north pole and the south pole of the bar magnet, having the designation "x/mm".

The diagram of FIG. 4 shows a variation over time of the bridge output signal, which now, within the entire range of this change in position of the sensor with respect to the bar magnet along the motion coordinate of in this case ±5 mm, behaves linearly proportionally to this change in position of the sensor with respect to the bar magnet, so that even at the ends of the range of this change in position shown overall, in this case of at most ±5 mm, the bridge output signal retains a linear profile despite greatly decreasing values for the magnetic field strength in the x direction. There, the bridge output signal can thus likewise still be used for the desired position measurement. The range along the motion coordinate between the north pole and the south pole of the bar magnet that can be used in this arrangement for position measurement is again shown in FIG. 4 by the designation "displacement range". It can be seen that this range along the motion coordinate that can be used for position measurement makes at least almost full use of the dimension of the bar magnet between its north pole and its south pole. Using the arrangement shown in FIG. 4, it is therefore possible to select the length of the magnet, that is to say the dimension of the bar magnet along the motion coordinate, to be only as great as the range that can be used for position measurement. This significantly reduces the space requirement of the arrangement and also the material requirement for the bar magnet.

Figure 5:
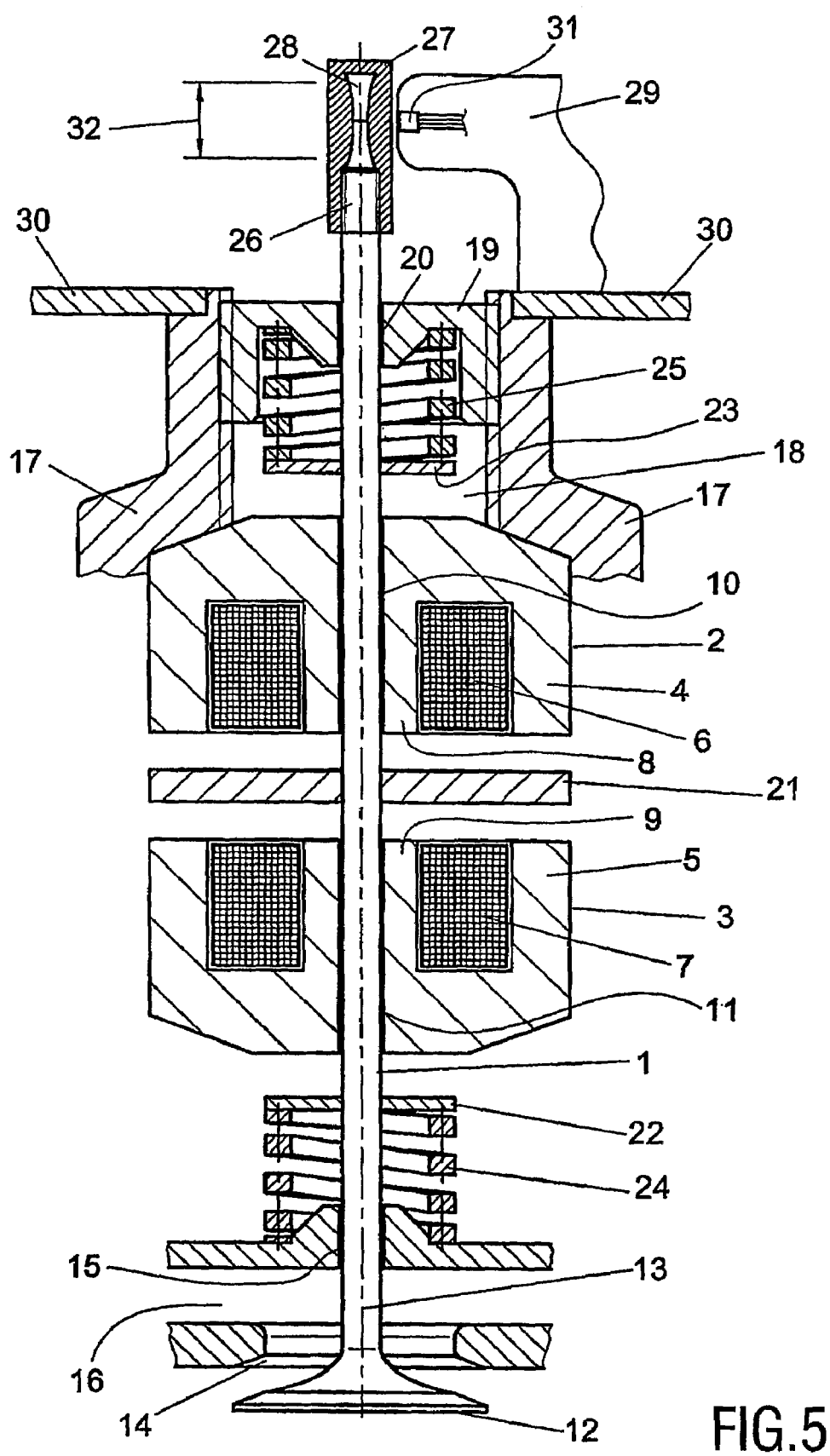
FIG. 5 shows a schematic illustration of a valve mechanism for the internal combustion engine of a motor vehicle, as an example of embodiment of one use of the invention.

FIG. 5 shows, in longitudinal section along its valve shaft 1, a schematic illustration of a valve mechanism for the internal combustion engine of a motor vehicle as an example of embodiment of one use of the invention. This valve mechanism comprises an actuator consisting of two annular electromagnets 2, 3, which each comprise a pot-shaped iron core 4 and 5, respectively, and an annular winding 6 and 7, respectively. The valve shaft 1 is led through in each case one cylindrical opening 10 or 11 in each case in a central pole 8 or 9 of the pot-shaped iron cores 4 and 5. The annular electromagnets 2, 3 are at a fixed spacing from one another and are arranged as a mirror image of one another. A disk-shaped armature 21 of magnetizable steel is arranged between them. This armature 21 is fixedly connected to the valve shaft 1 and is moved with the latter and with a valve disk 12 connected to the latter with respect to the annular electromagnets 2, 3 along a longitudinal axis 13 of the valve shaft 1 which at the same time forms a motion coordinate of the valve shaft 1. The valve disk 12 is alternately lifted off a valve seat 14 and pressed against the same. Part of the cylindrical head having a first guide 15 for the valve shaft 1 on the valve disk side and an inlet and outlet channel 16 for fuel mixture or exhaust gas and also a fixing 17 for the annular electromagnets 2, 3 is shown in FIG. 5. A threaded bore 18 is furthermore arranged in the fixing 17 in a manner concentric to the valve shaft 1, in which threaded bore 18 there is an adjusting screw 19 which is shaped with a second guide 20 for the valve shaft 1.

Furthermore, a first and a second spring plate 22, 23 are arranged fixedly on the valve shaft 1 in a manner coaxial to the longitudinal axis 13, on which spring plates a first and a second compression spring 24 and 25 are respectively supported by in each case one end. The first compression spring 24 is supported by its other end on the cylindrical block, namely, in the example of embodiment shown, on the first guide 15 for the valve shaft 1 on the valve disk side. The second compression spring 25 is supported by its other end on the adjusting screw 19, namely, in the example of embodiment shown, on the second guide 20 for the valve shaft 1. In this way, the first compression spring 24 acts to close the valve, that is to say to press the valve disk 12 against the valve seat 14. If there were no actuator, then the first compression spring 24 would ensure that the valve is tightly closed. The second compression spring 25 acts to open the valve, that is to say to lift the valve disk 12 off the valve seat 14. If there were no actuator, then the second compression spring 25 would ensure that the valve is opened. Both springs operate "against one another". By means of this design, inter alia the armature 21 is held in a central position which can be adjusted by adjusting the adjusting screw 19 in the threaded bore 18.

If current passes through the first electromagnet 2, which is the upper electromagnet in FIG. 5, then the armature 21 is drawn upward and the valve is closed. Accordingly, the armature 21 moves downward and opens the valve if current passes through the second electromagnet 3, which is the lower electromagnetic in FIG. 5. If there is no current passing through either of the electromagnets 2, 3 then the armature 21 is kept in the aforementioned central position by the springs and the valve is half-open.

The main advantage of this design with the compression springs 24, 25 operating against one another together with the actuator lies in the changeover principle realized thereby. If current passes through the upper, first electromagnet 2, the armature 21 is in its upper position in which it bears tightly against the first electromagnet 2, with the second, upper spring 25 being compressed and the first, lower spring 24 being relaxed, and if as a result the valve is closed and is to be opened, then the current through the upper, first electromagnet 2 is switched off. The armature 21, by virtue of the spring resistances, then swings back until it reaches its lower position, ideally until it has almost reached it but not quite on account of the frictional forces in the mechanical construction. In this lower position, the armature 21 bears tightly against the second electromagnet 3, with the second, upper spring 25 being relaxed and the first, lower spring 24 being compressed, and as a result the valve being opened. The lower, second electromagnet 3 need in this case only have current flow weakly through it in order to draw the armature 21 fully into its lower position. Without a spring design, very strong currents had to flow through the lower, second electromagnet 3 in order to be able to exert a strong enough magnetic force on the armature 21, on account of the large travel of the armature in the case of a typical valve lift of around 8-12 mm and the associated large spacing between the armature 21 and the lower, second electromagnet 3 in the upper position of the armature 21.

To measure the position of the assembly consisting of valve shaft 1, valve disk 12 and armature 21, an arrangement comprising a bar magnet 28 accommodated in a nonmagnetic housing 27 is attached at the end 26 of the valve shaft 1 that faces away from the valve disk 12. In the example of embodiment shown, this attachment is effected by a thread on the end 26 of the valve shaft 1 that faces away from the valve disk 12 and on the housing 27. The bar magnet 28 is aligned with its longitudinal axis between north and south pole coaxial to the longitudinal axis 13 of the valve shaft. By way of example, the north pole faces away from the valve disk 12 and the south pole faces toward the valve disk 12. The longitudinal axis 13 of the valve shaft 1 therefore also forms the motion coordinate of the bar magnet 28.

A magnetoresistive sensor 31 is located on a sensor fixing 29 which, in the example of embodiment shown in FIG. 5, is mounted on a covering plate 30 seated on the fixing 17 for the annular electromagnets 2, 3. This magnetoresistive sensor 31 is preferably again of the KMZ 10 B type. For this purpose, the sensor fixing 29 is equipped with a mounting surface, on which the sensor 31 is fitted in a planar manner. The magnetoresistive elements of the sensor 31 are aligned in a plane that is coincident with the plane of the drawing in FIG. 5 and in which the motion coordinate of the bar magnet 28 is also located; in their longitudinal direction, the magnetoresistive elements of the sensor 31 are aligned in the direction of the motion coordinate of the bar magnet 28. The sensor 31 measures the field component of the magnetic field generated by the bar magnet 28 which lies perpendicular to the motion coordinate in the plane of the drawing. In FIG. 5, the range along the motion coordinate between the north pole and the south pole of the bar magnet 28 that can be used in this arrangement for position measurement is shown by the arrows 32.

The invention claimed is:

1. An arrangement for determining the position of a magnetic-field-sensitive sensor unit in the magnetic field of a magnet arrangement having an at least substantially bar-shaped contour along an at least substantially rectilinear motion coordinate that extends parallel to a longitudinal axis of the at least substantially bar-shaped contour, in which the magnetic-field-sensitive sensor unit is intended to measure a component of the magnetic field which extends in a plane that is at least substantially parallel to the longitudinal axis of the at least substantially bar-shaped contour in a manner at least substantially perpendicular to this longitudinal axis and which is substantially isolated from other magnetic fields, and the magnet arrangement has a magnetic north pole in a region of a first end of the at least substantially bar-shaped contour and a magnetic south pole in a region of a second end of the at least substantially bar-shaped contour, and a narrowing of the at least substantially bar-shaped contour in the central region extending between the north pole and the south pole.

2. An arrangement as claimed in claim 1, characterized in that the narrowing of the at least substantially bar-shaped contour corresponds at least in sections to a shape that at least substantially follows the profile of an ellipse.

3. An arrangement as claimed in claim 1, characterized in that the narrowing of the at least substantially bar-shaped contour corresponds at least in sections to a shape that at least substantially follows the profile of a cycloid.

4. An arrangement as claimed in claim 1, characterized in that the magnetic-field-sensitive sensor unit is designed with a Wheatstone bridge of magnetoresistive elements, the longitudinal direction of which extends at least substantially along the motion coordinate.

5. An arrangement as claimed in claim 1, characterized in that the magnet arrangement is connected to a first body and the sensor unit is connected to a second body, in order to determine the position of the first body with respect to the second body along the motion coordinate.

6. An arrangement as claimed in claim 5, characterized in that the first and second bodies are formed by parts of a motor vehicle.

7. An arrangement as claimed in claim 6, characterized in that the first and second bodies are formed by parts of the internal combustion engine of a motor vehicle.

8. An arrangement as claimed in claim 7, characterized in that the second body comprises part of a valve mechanism for the internal combustion engine of a motor vehicle, and the first body is designed with a part of the valve mechanism that can move with respect thereto.

* * * * *